Figure 1:
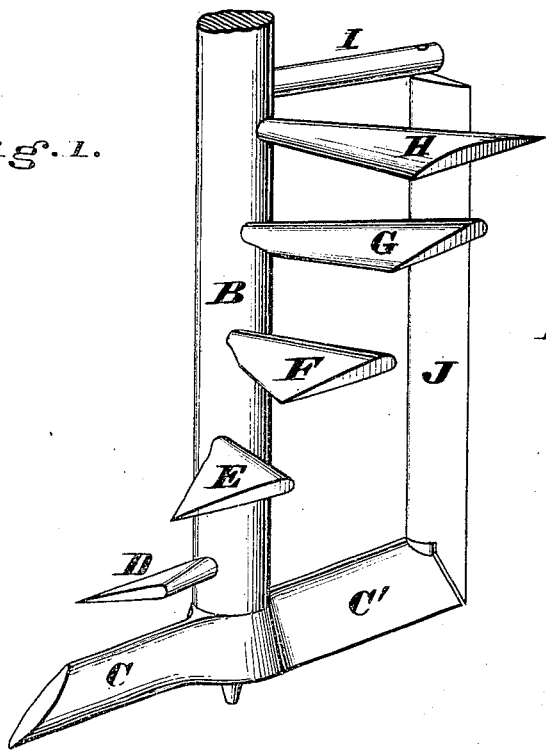

H. MUTH.

Improvement in Stirrers and Beaters for Batter, Eggs, &c.

No. 132,483. Patented Oct. 22, 1872.

UNITED STATES PATENT OFFICE.

HENRY MUTH, OF CINCINNATI, OHIO.

IMPROVEMENT IN STIRRERS AND BEATERS FOR BATTER, EGGS, &c.

Specification forming part of Letters Patent No. 132,483, dated October 22, 1872.

*To all whom it may concern:*

Be it known that I, HENRY MUTH, of Cincinnati, Hamilton county, Ohio, have invented a new and useful Stirrer or Beater, of which the following is a specification:

Nature and Objects of the Invention.

My invention relates to an improved form of stirrer or beater for eggs, batter, and other preparations of the pastry-cook or confectioner; and consists in an arrangement of spiral blades or beaters, of which the lowest ones operate to scrape the bottom of the vessel, and, in conjunction with those above it, to elevate and intermingle the components of the batter or other substance to be operated upon, the lowest blades being set the most obliquely for that purpose, while the uppermost blade, being horizontal on its under side, operates to press or beat down the particles for the time being uppermost. My stirrer also comprises a self-opening scraper for the automatic removal from the sides of the vessel of all adhering particles.

Description with Reference to the Drawing.

Figure 3:
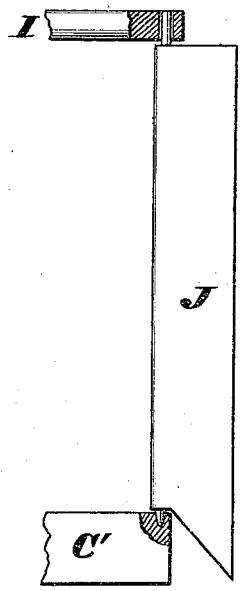
Figure 2:
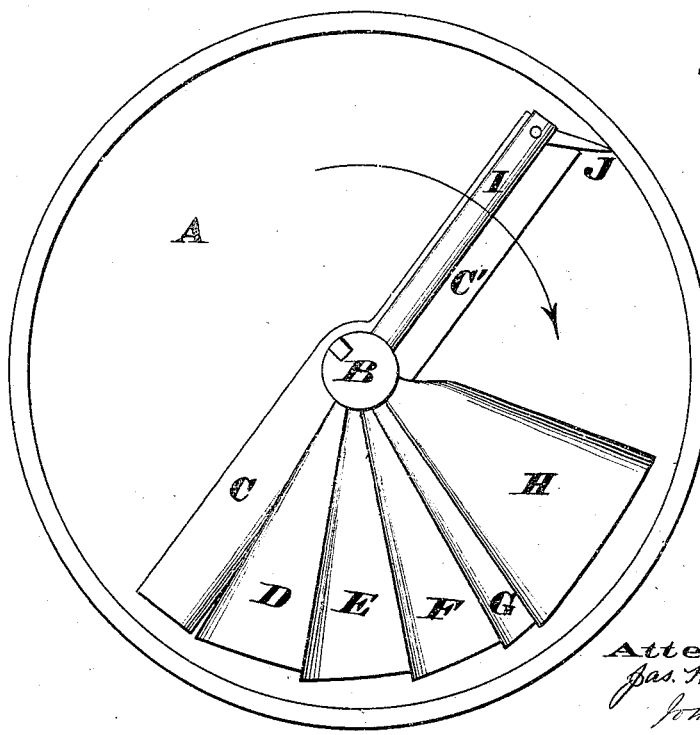

Figure 1 is a perspective view of the lower or operative parts of a batter-stirrer embodying my invention. Fig. 2 is a top view of the same in its containing-vessel. Fig. 3 represents my self-acting scraper detached.

A is a tub or other containing-vessel of circular horizontal section. B is the lower portion of a shaft journaled axially in said vessel. From opposite sides of said shafts lower end project horizontally two obliquely-presented blades, C C'. These blades have an obliquity of about forty-five degrees and equally operate, when the shaft is rotated to the right, to scrape up all matters adhering to the floor of the vessel. A little above and in rear of blade C is another blade, D, of somewhat less obliquity, whence a series of blades, E, F, G, and H, each one being in rear of and of somewhat less obliquity than that next below it, extend rectangularly from and in regularly increasing elevations from the shaft; the uppermost blade H being horizontal. Somewhat higher than the blade H, and in the vertical plane of blade C', is an arm, I, in which, and in the said blade C', is pivoted a blade, J. The advance edges of all of the above blades are knife-edged.

Operation.

The vessel being charged with batter or other matter to be operated upon—in such quantity as, after being beaten up, to remain a little below the uppermost blade H—the stirrer is rotated to the right. The lower blades C C' then operate to scrape up matter adhering to the bottom, and the blade F, self-unfolding by the pressure or resistance of the batter, operates to remove matters which adhere the sides of the vessel, and all of the oblique blades, as fast as the batter reaches them, operate to cut, scrape, and stir it and to thoroughly comminute and intermingle its component particles. The duty of the uppermost blade H, on the contrary, is to press down and compact the more frothy portions and cause them to re-enter the general mass.

I claim as new and of my invention—

The stirrer or beater, composed of vertical shaft B, oblique blades C C', D, E, F, and G, horizontal blade H, and self-opening scraper J, pivoted in blade C' and arm I, as and for the purpose set forth.

In testimony of which invention I hereunto set my hand.

HENRY MUTH.

Attest:
GEO. H. KNIGHT,
JAMES H. LAYMAN.